US012600205B2

(12) United States Patent
Thomas et al.

(10) Patent No.: US 12,600,205 B2
(45) Date of Patent: Apr. 14, 2026

(54) UPPER DOOR ATTACHMENT FOR A UTILITY TERRAIN VEHICLE

(71) Applicant: St. Anthony, LLC, Payson, UT (US)

(72) Inventors: Dan B. Thomas, Payson, UT (US); Eric B. Nelson, Santaquin, UT (US); Marc J. Stephenson, Santaquin, UT (US); Cole P. Tomadakis, Spanish Fork, UT (US)

(73) Assignee: St. Anthony, LLC, Payson, UT (US)

( * ) Notice: Subject to any disclaimer, the term of this patent is extended or adjusted under 35 U.S.C. 154(b) by 71 days.

(21) Appl. No.: 18/637,394

(22) Filed: Apr. 16, 2024

(65) Prior Publication Data

US 2024/0408942 A1 Dec. 12, 2024

Related U.S. Application Data

(63) Continuation of application No. 17/534,921, filed on Nov. 24, 2021, now Pat. No. 11,958,342.

(60) Provisional application No. 63/117,760, filed on Nov. 24, 2020.

(51) Int. Cl.
*B60J 1/08* (2006.01)
*B60J 1/00* (2006.01)
(52) U.S. Cl.
CPC ............... *B60J 1/085* (2013.01); *B60J 1/006* (2013.01)

(58) Field of Classification Search
CPC . B60J 1/2011; B60J 1/006; B60J 1/085; B60J 5/0486; B60J 5/125; B60J 5/065; B60J 5/0468; B60J 5/0476; B60J 11/08
USPC ..................................... 296/146.1, 147, 148
See application file for complete search history.

(56) References Cited

U.S. PATENT DOCUMENTS

| | | | | |
|---|---|---|---|---|
| 7,832,788 | B2 * | 11/2010 | Marsh | B60J 7/10 |
| | | | | 296/146.1 |
| 9,796,251 | B2 * | 10/2017 | Kinsey | B60J 5/06 |
| 10,124,654 | B2 * | 11/2018 | Martin | B60J 1/006 |
| 10,369,872 | B2 * | 8/2019 | Jackson | G05D 1/0088 |
| 10,800,230 | B2 * | 10/2020 | Mazzarelli | B60J 1/085 |
| 2009/0183808 | A1 * | 7/2009 | Sappington | B60J 7/10 |
| | | | | 150/159 |
| 2016/0318376 | A1 * | 11/2016 | Martin | B60J 1/006 |
| 2018/0154743 | A1 * | 6/2018 | Rao | B60R 13/0243 |
| 2018/0229591 | A1 * | 8/2018 | Mazzarelli | B60J 5/0487 |

* cited by examiner

*Primary Examiner* — Dennis H Pedder
(74) *Attorney, Agent, or Firm* — DENTONS Durham Jones Pinegar

(57) ABSTRACT

A system that secures an upper door of a UTV or other vehicle to the vehicle and enables the ready removal and storage of the upper door from the vehicle employs magnets. A first set of magnets is carried by the upper door. A second set of magnets, which is attracted to the first set of magnets, is carried directly or indirectly by the vehicle, such as by a filler panel secured to the vehicle. Methods of deploying and securing an upper door in place and at least partially removing the upper door are also disclosed.

20 Claims, 14 Drawing Sheets

UPPER DOOR ATTACHMENT FOR A UTILITY TERRAIN VEHICLE

CROSS-REFERENCE TO RELATED APPLICATION

This application is a continuation of U.S. patent application Ser. No. 17/534,921, titled UPPER DOOR ATTACHMENT FOR A UTILITY TERRAIN VEHICLE, filed Nov. 24, 2021 ("the '921 application"), now U.S. Pat. No. 11,958, 342, issued Apr. 16, 2024, which claims the benefit of priority to the Nov. 24, 2020 filing date of U.S. Provisional Patent Application No. 63/117,760, titled APPARATUSES AND PROCESSES FOR REMOVABLY ATTACHING AN UPPER DOOR TO UTILITY TERRAIN VEHICLE ("the '760 Provisional Application"), is hereby made pursuant to 35 U.S.C. § 119 (e). The entire disclosure of the '921 Application and the '760 Provisional Application are hereby incorporated herein.

TECHNICAL FIELD

This disclosure relates generally to utility vehicle doors and more particularly to apparatus and processes for attaching an upper door to a utility terrain vehicle.

BACKGROUND OF RELATED ART

Many utility terrain vehicles, sometimes called all-terrain vehicles or off-road vehicles (all referred to herein collectively as UTVs and each referred to herein individually as a UTV) have a somewhat similar structure: support framework; an engine or a motor; four wheels; a roll bar; and an enclosure. The framework normally includes side doors and a windshield, and the enclosure may have a rear window. The side doors normally include at least one lower door with hinges that attach to the vehicle frame. At least one upper door may be provided later if needed. It may be connected to the enclosure and lower door and may include a side window on the side door. The side window is usually made of transparent plastic providing visibility and durability.

Some upper doors of UTVs employ a zipper for opening or closing the side window to help control the temperature in the UTV. Typically, one side of the zipper is mounted on the enclosure of the UTV and the other side of the zipper is connected to the window so as to join the window to the enclosure.

FIG. 1 shows a typical arrangement utilizing such a zipper. Specifically, FIG. 1 shows a UTV 10 with an upper door 12 connected to a UTV enclosure 14. A zipper 16 is used to connect the front and top portions of the upper door 12 to a frame of the UTV 10. One major problem with this approach is that the zipper can easily become clogged with mud and dirt, making it difficult or impossible to operate. Moreover, in cold conditions, the zipper may be clogged with ice. In addition to the inconvenience and work involved in trying to clear a clogged zipper, failure or difficulty in using a zipper can prevent rapid egress from the UTV to avoid danger. In addition, the zipper approach usually requires a rather bulky internal frame or enclosure member, which may be difficult to install and to use. Furthermore, upper doors have been difficult to stow when not needed without being an obstacle and still be conveniently available to re-install when the temperature inside the enclosure drops.

In U.S. Pat. No. 10,800,230 (Mazzarelli et al.), rather than a zipper connection for the upper doors, UTV windows are arranged to pivot on an axis between open and closed positions. This approach is likely to result in some of the same problems mentioned above, particularly with respect to mud, dirt and ice interfering with the operation of the windows between open and closed positions.

SUMMARY

In various aspects and embodiments, an upper door for a UTV or other vehicle is disclosed that can be easily stowed when not needed and can be quickly and safely positioned in an enclosure of the UTV or other vehicle when needed.

An apparatus is provided for removably attaching an upper door to a vehicle, comprising: a member on the vehicle adjacent to the upper door; a first magnet having a first polarity, the first magnet being attached to the member at a first location on the member; a second magnet having a second polarity opposite to the first polarity, the second magnet being attached to the upper door at a second location on the upper door; wherein the first magnet positioned at the first location is adjacent to the second magnet positioned at the second location to thereby magnetically attach the upper door to the member.

More specifically, an apparatus is provided for selectively attaching and detaching a soft upper door of a vehicle, such as a UTV or other off-road vehicle. The apparatus may comprise a member attached to the vehicle adjacent to the upper door, a first set of magnets attached to the panel at a first location, and a second set of magnets attached to the upper door. Second magnets of the second set may be positioned adjacent to the locations of first magnets of the first set to enable the upper door to be removably secured to the member. The first set of magnets may all have a first polarity. The second set of magnets may all have a second polarity. The second polarity may be opposite the first polarity.

A method for attaching and detaching an upper door of a UTV, another off-road vehicle, or another vehicle may include attaching a first set of magnets at a certain location on the upper door, attaching a panel to the off-road vehicle adjacent to the upper door, and attaching a second set of magnets to the panel. The locations of second magnets of the second set may coincide with certain locations of first magnets of the first set. The second magnets may have a polarity opposite the polarity of the first magnets. The upper door may be attached to the vehicle by placing the first set of magnets on the upper door at positions adjacent to the second set of magnets on the panel.

Other aspects of the disclosed subject matter, as well as features and advantages of various aspects of the disclosed subject matter, will become apparent to those of ordinary skill in the art through consideration of the ensuing description, the accompanying drawings, and the appended claims.

DETAILED DESCRIPTION

In various embodiments, magnets are used to quickly and securely install a soft upper door in a UTV enclosure and to enable the upper door to be easily uninstalled and stowed for future use. More specifically, a first set of first magnets of a first polarity are positioned along at least part of the periphery of the upper door. A second set of second magnets of a second polarity, which is opposite from the first polarity, are disposed in filler panels connected to a frame of the UTV so as to match up with and attract the first set of magnets and secure the upper door to the filler panels.

The soft upper door with the first magnets can easily be unrolled from a stowed arrangement and manually positioned to make contact between the first magnets on the soft upper door and the second magnets on the filler panels. Conversely, the first magnets and the second magnets enable the soft upper door to be manually and quickly removed from the enclosure and/or frame of the UTV; the soft upper door may then be rolled up into the stowed arrangement and stowed away for future use.

Figure 1:
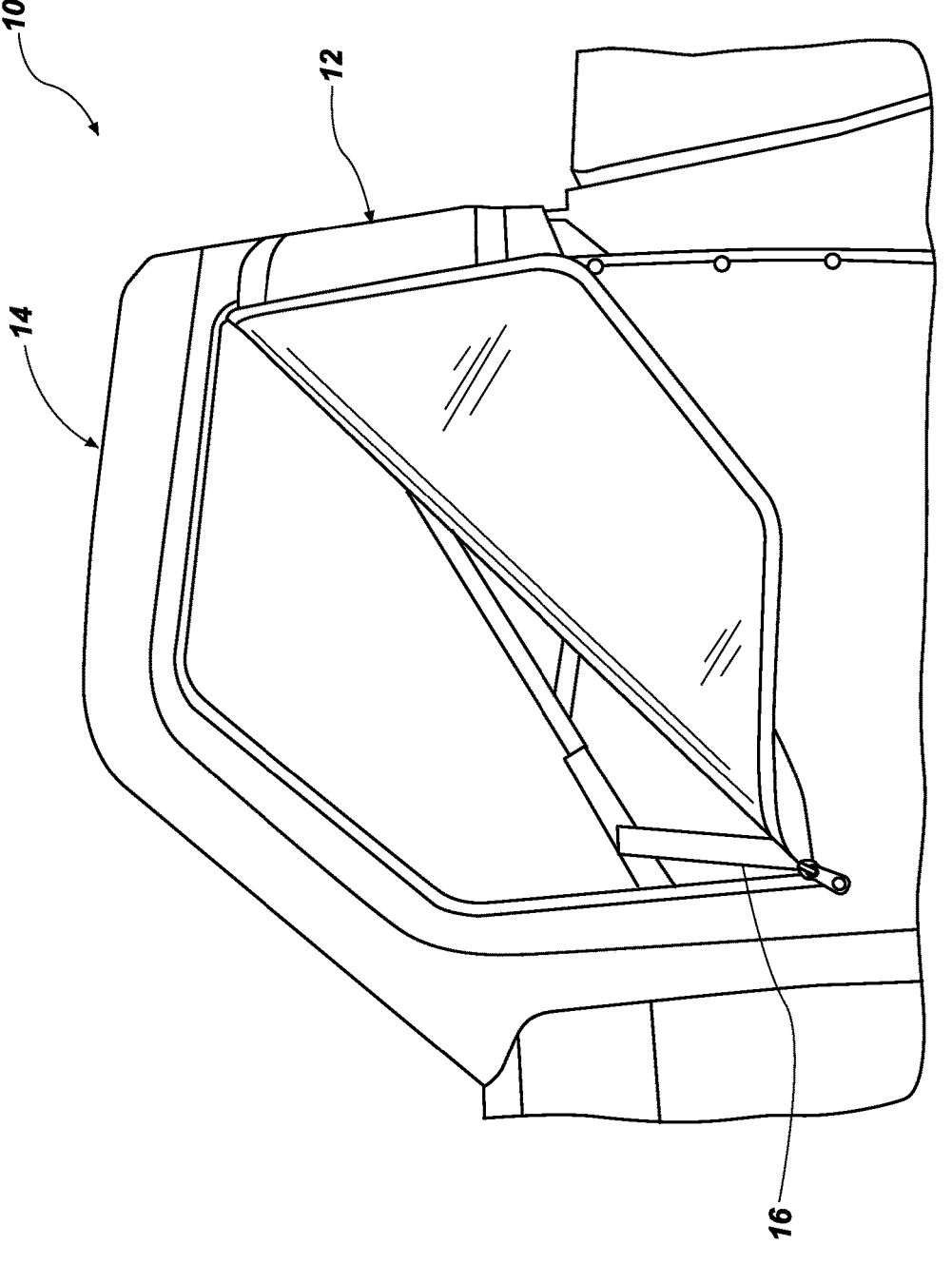
FIG. 1 is a perspective view of a UTV having a prior art zipper arranged to open and close a soft upper door.
Figure 2:
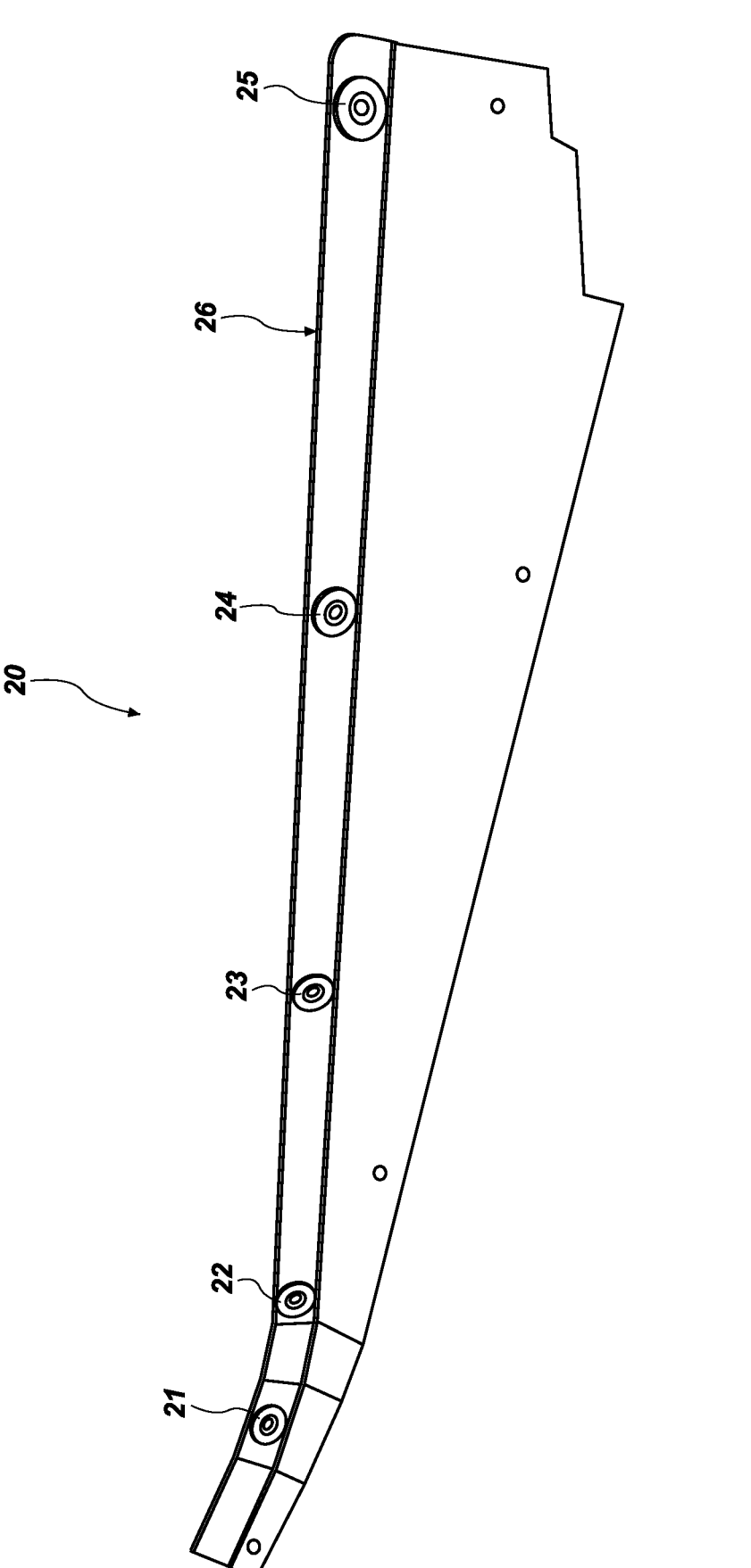
FIG. 2 is a perspective view of a filler panel according to an embodiment described in the present disclosure.

Referring to FIG. 2, a filler panel 20 is produced having second magnets 21-25 strategically spaced along one edge 26 of the filler panel 20. The panel 20, which may be secured to a UTV 40 (FIG. 5), may be made of any of a variety of suitable materials. The filler panel 20 may be made from a lightweight material. The material from which the filler panel 20 is made may be non-ferrous material, or a material that will not convey a magnetic field. Some non-limiting examples of suitable materials include lightweight metals (e.g., aluminum, etc.), lightweight plastics, and fabrics (e.g., nylon, etc.) reinforced with one or more layers of a more rigid material (e.g., a lightweight plastic, a rigid foam, etc.). The filler panel 20 is configured to fit in or on a portion of a UTV enclosure and/or frame.

Figure 3:
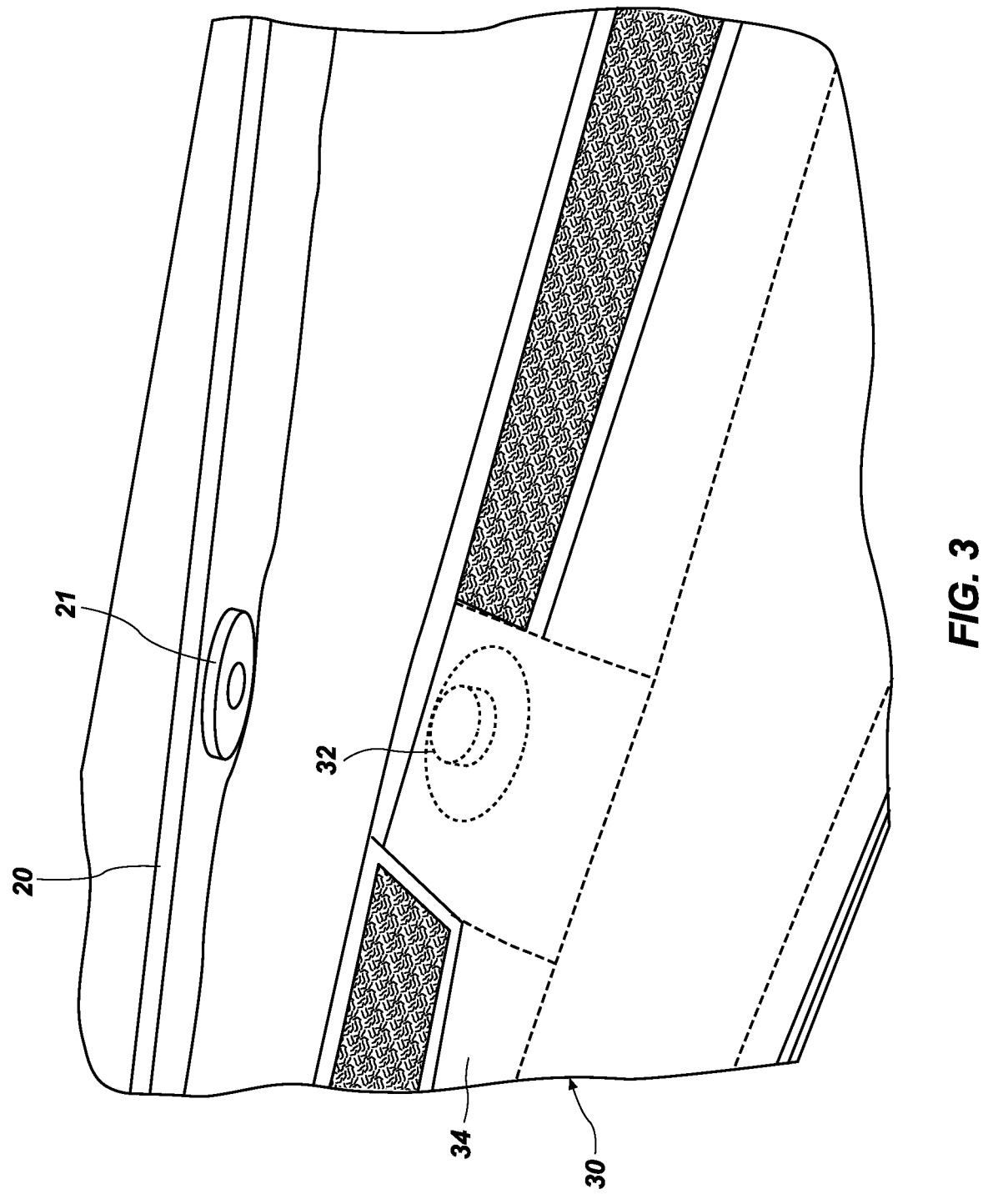
FIGS. 3 and 4 are perspective views showing the filler panel with a magnet embedded in a fabric piece that is separate from or adjacent to a magnet on the panel, according to an embodiment shown in the present disclosure.

Referring to FIG. 3, a portion of the filler panel 20 is shown in position on a UTV frame with the filler panel 20 carrying a second magnet 21 facing towards a portion of a soft upper door 30. Alternatively, the second magnet 21 may be secured directly to a portion of the UTV 40 (FIG. 5) (e.g., a non-ferrous portion of the UTV 40), such as a plastic feature (e.g., a roof, etc.) of the UTV 40. A first magnet 32 of polarity opposite to the polarity of the second magnet 21 is disposed within the fabric 34 of the portion of the soft upper door 30.

Figure 4:
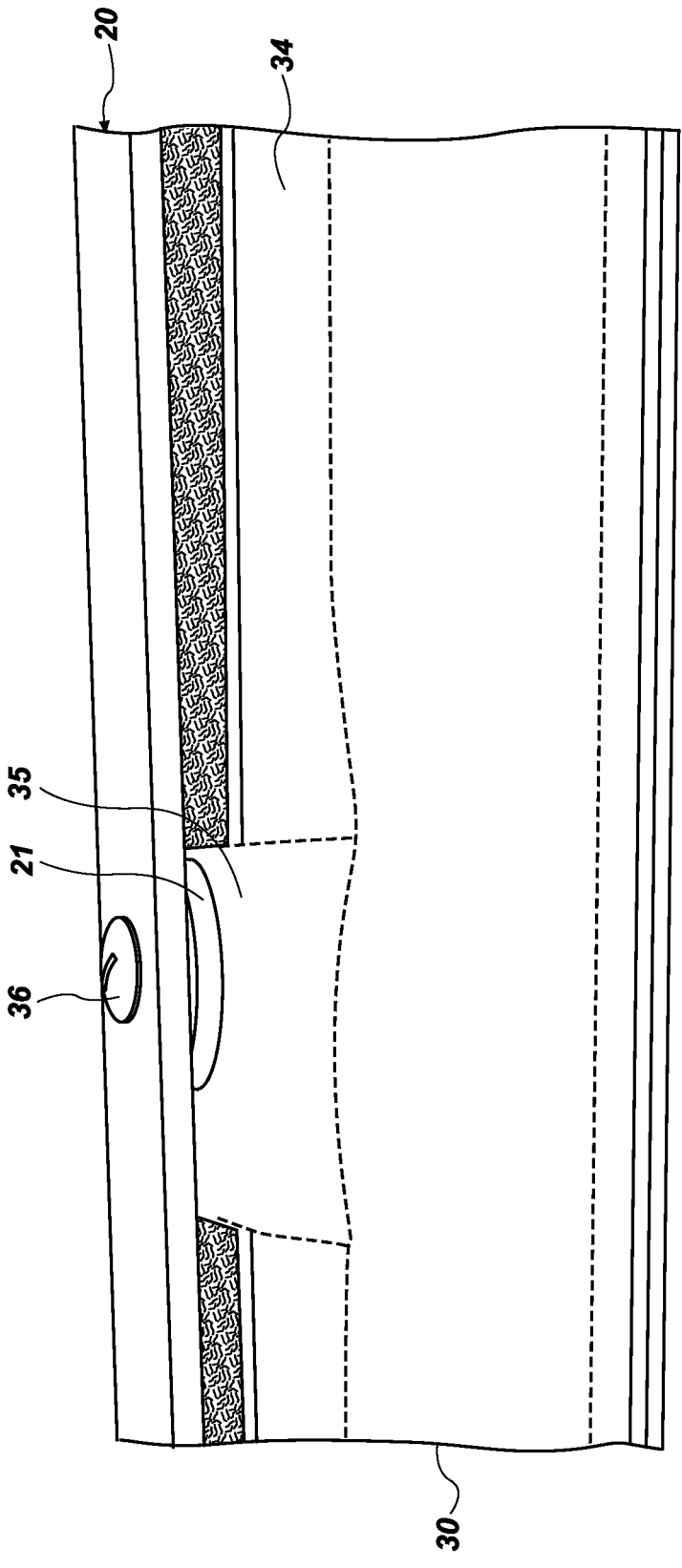

Looking now at FIG. 4, the portion of the soft upper door 30 has been placed next to the filler panel 20 so that the corresponding second magnet 21 and first magnet 32 are in close proximity, separated only by the fabric 34 of the soft upper door 30 and, optionally, a cover (e.g., fabric, plastic, etc.) over the filler panel 20 and/or second magnet 21. Since the first magnet 32 and the second magnet 21 are of opposite polarity, they are strongly connected to each other, as shown in FIG. 4. Rivets 36 are shown on the back side of the filler panel 20, securing the second magnet 21 in place on the filler panel 20.

Figure 5:
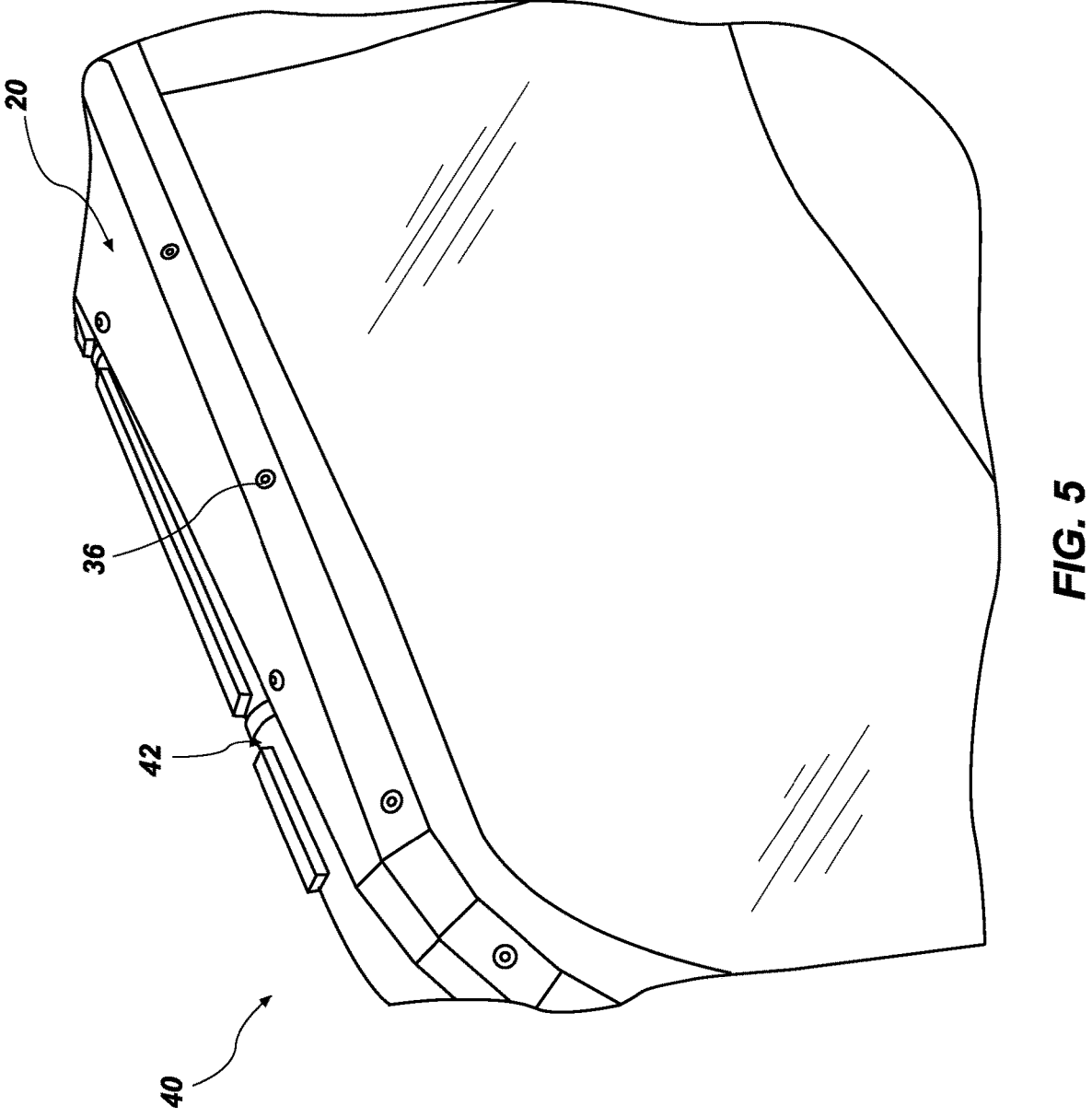
FIG. 5 is a perspective view of portions of a UTV according to an embodiment shown in the present disclosure.

Referring next to FIG. 5, a UTV assembly is shown in which the filler panel 20 is disposed on the UTV 40, being attached to the roof horizontal portion of a roll bar 42 of the UTV 40. Rivets 36 are shown securing the second magnets 21-25 (FIGS. 2-4) to the filler panel 20.

Figure 6:
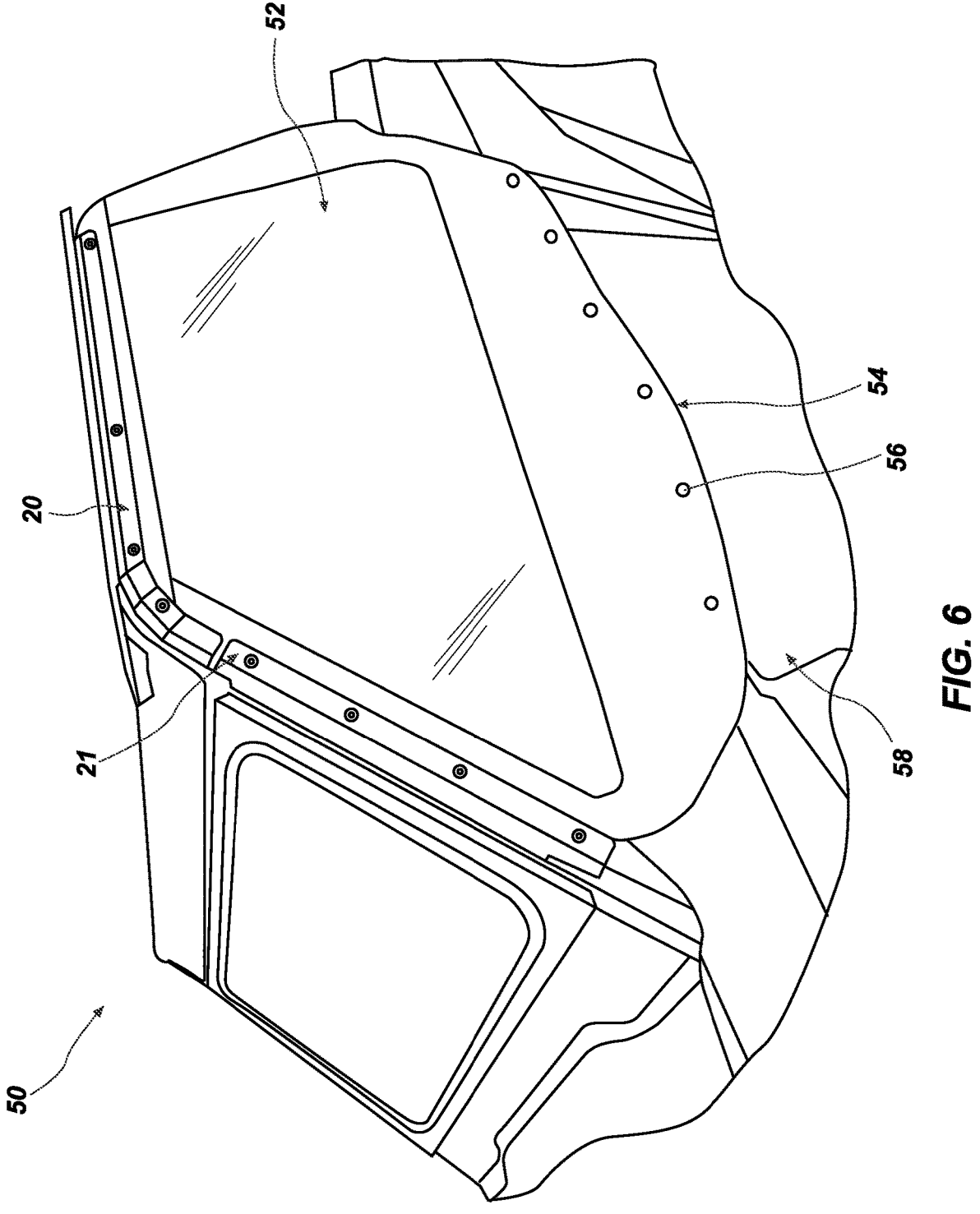
FIG. 6 is a perspective view of portions of a UTV according to an embodiment shown in the present disclosure.

Looking next at FIG. 6, a vehicle 50 (e.g., a two-seat UTV) is shown having a soft upper door 52 closed by magnetic attachment to the vehicle 50. A filler panel 20 is attached to a roll bar 42 at a location where a top of the soft upper door 52 can be attached from an interior of the vehicle 50, as shown in FIG. 5. More specifically, the filler panel 20 may include a top portion and a side portion that are secured together at an angle (e.g., an angle of about 90° to about 135°, etc.) with the top portion positionable over at least a portion of a top surface of the roll bar 42 and the side portion positionable over at least a portion of an outside surface of the roll bar 42. Thus, the filler panel 20 may wrap at least partially around the roll bar 42. A portion of the filler panel 20 or an additional filler panel 21 runs down a front portion of the roll bar 42 at a location where a front of the soft upper door 52 can be attached. A bottom portion 54 of the soft upper door 52 is secured by multiple snaps 56 that connect to corresponding snaps (not shown) on a lower door 58 of the vehicle 50. A similar soft upper door (not shown) may be installed on the lower door of the other side door (not shown) of the vehicle 50.

Figure 7:
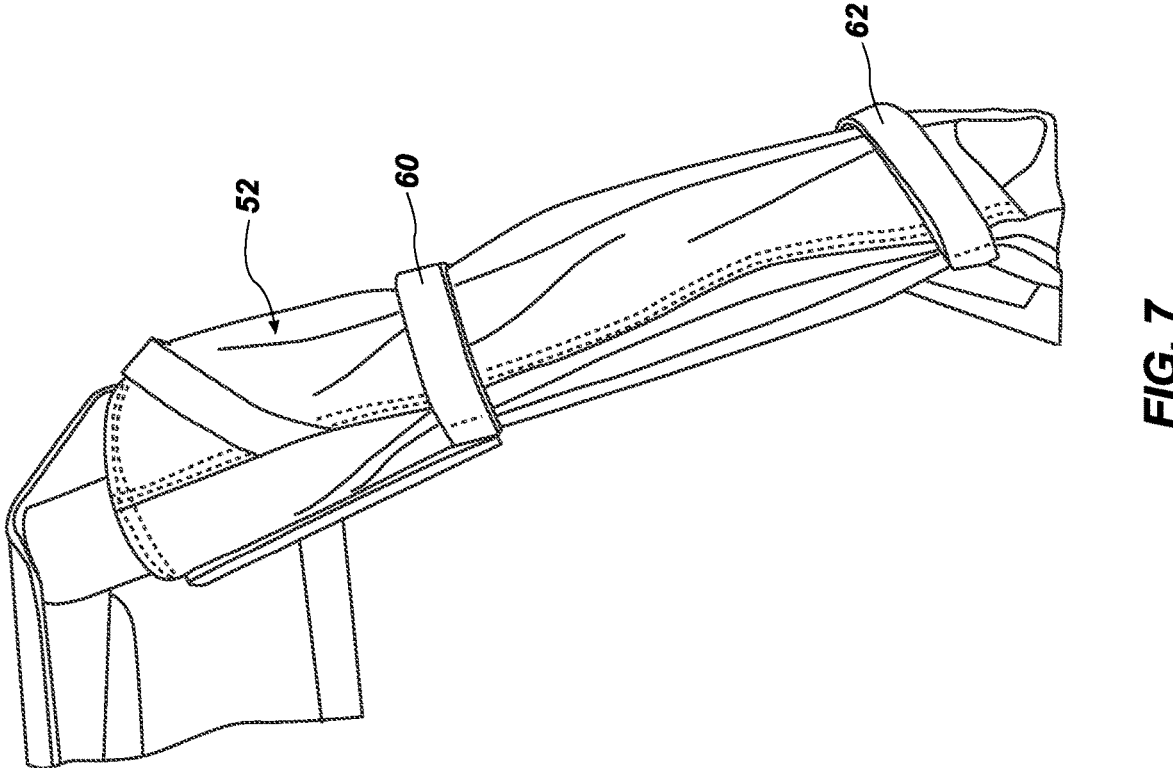
FIG. 7 is a perspective view of a rolled up upper soft door of a UTV according to an embodiment shown in the present disclosure.

Referring next to FIG. 7, the soft upper door 52 is shown rolled up for stowing. Two straps 60 and 62 maintain the soft upper door 52 in the rolled-up arrangement. While the soft upper door 52 is in the rolled-up arrangement, the straps 60 and 62 may secure the soft upper door 52 to a rear portion of the roll bar 42. Thus, the soft upper door 52 may be partially detached from the vehicle 50 and, thus, be stowed while remaining partially attached to the vehicle 50. Alternatively, the soft upper door 52 may be completely detached from the vehicle 50 and then stowed. In embodiments where the soft upper door 52 is completely detached from the vehicle 50 for storage, the soft upper door 52 may be optionally placed in a bag, stowed in the vehicle 50 or apart from the vehicle 50, and/or, if the soft upper door 52 is stowed in the vehicle 50, it may be secured to the vehicle 50 (e.g., to another part of the roll cage, etc.). Accordingly, the soft upper door 52 may easily be partially or fully detached from the vehicle 50, rolled up and stowed, or secured, out of the way and still be conveniently and quickly retrieved, unrolled, and reattached to the vehicle 50 when needed.

Figure 8:
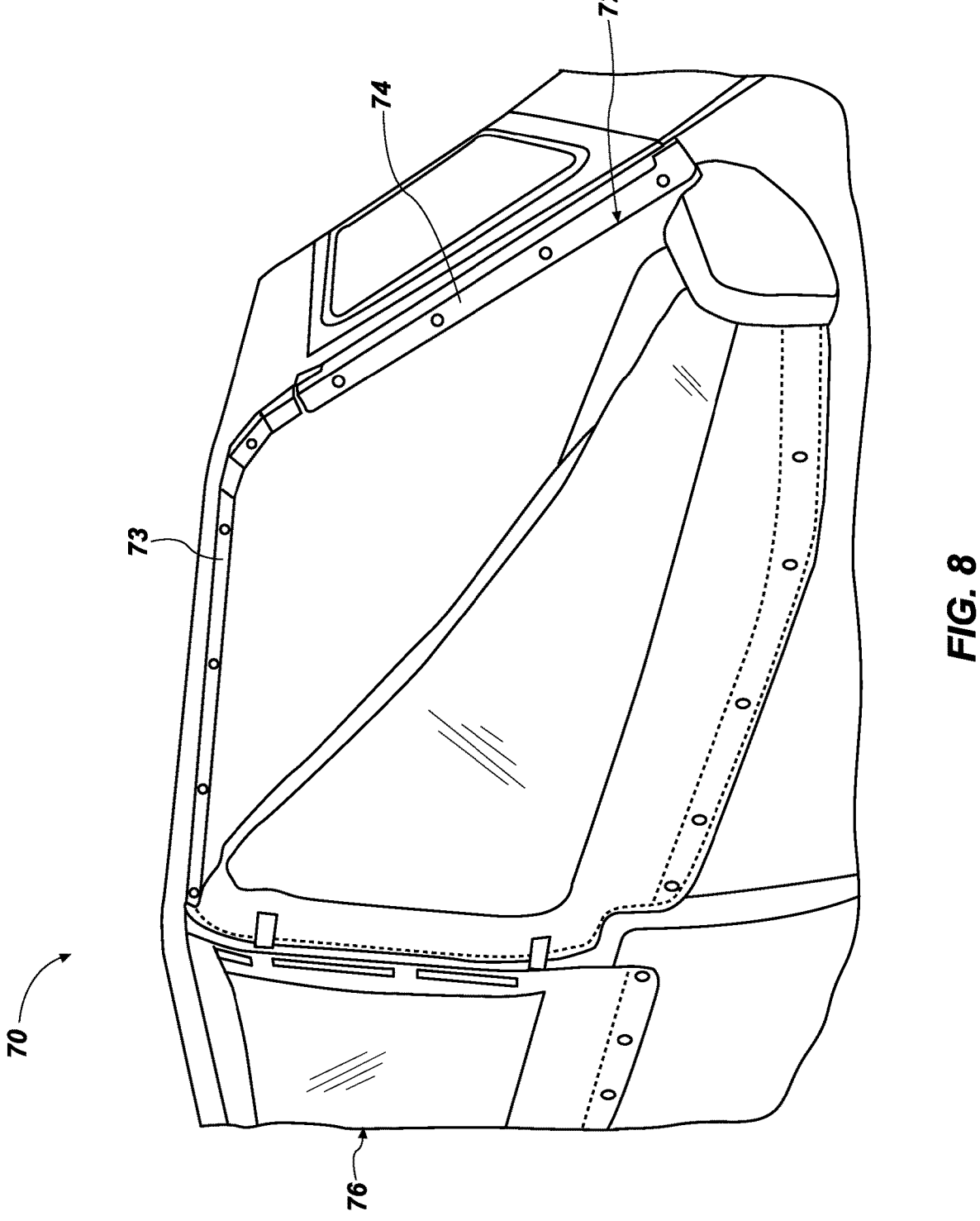
FIG. 8 is a perspective view of a front and a rear upper soft doors of a UTV according to an embodiment shown in the present disclosure.

Referencing FIG. 8, another embodiment is shown in which soft upper doors 72 are installed on a four-seat UTV 70. One of the front soft upper doors 72 is shown partially open. As with the two-seat UTV 50 shown in and described with reference to FIGS. 2-7, filler panels 73 and 74 include polarized magnets that connect to polarized magnets of the opposite polarity (not shown here). A rear soft upper door 76 is shown in closed position.

Figure 9:
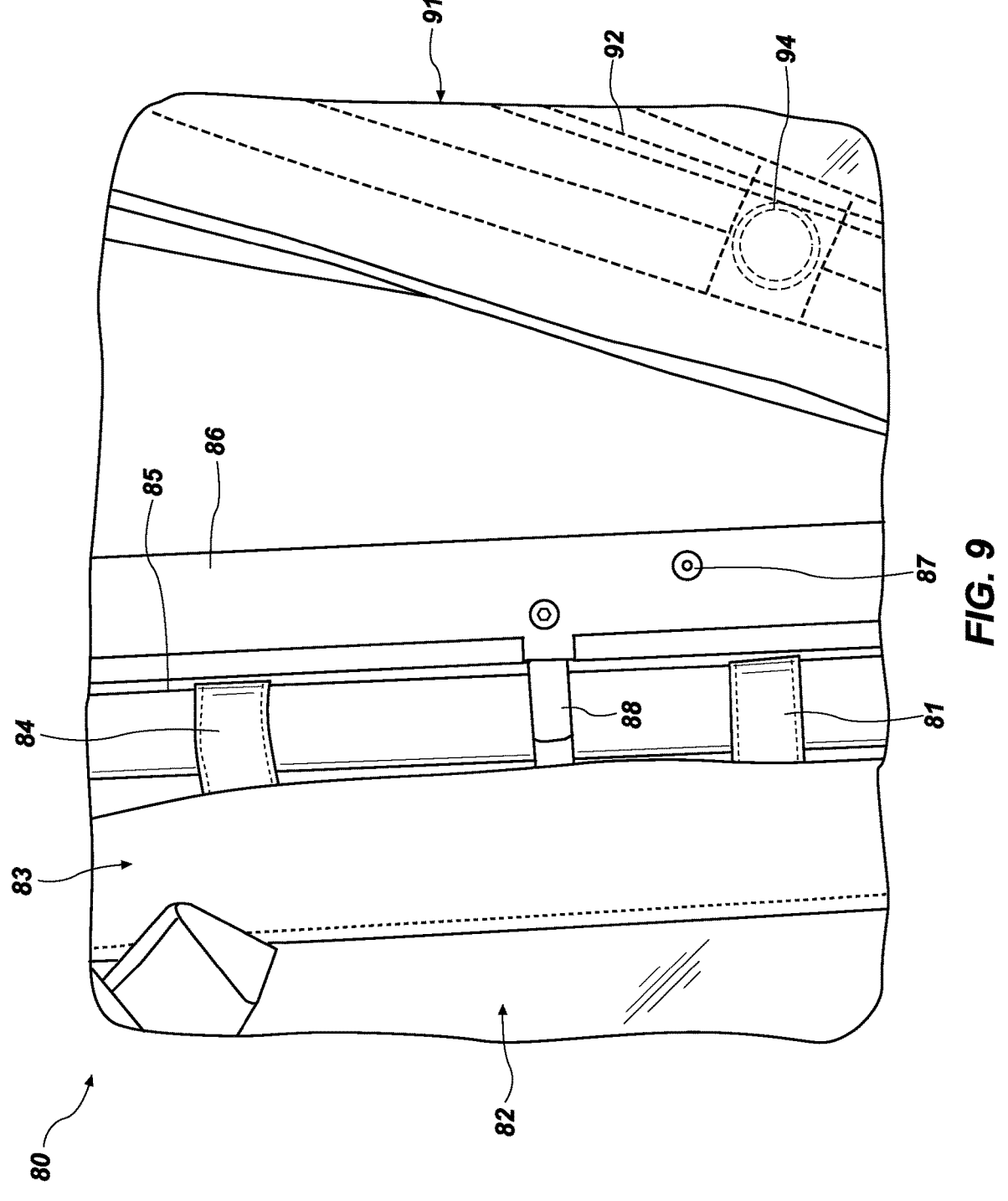
FIGS. 9 and 10 are perspective views of front and a rear upper soft doors of a UTV according to an embodiment of the present disclosure.

Looking now at FIG. 9, a close up view 80 is shown of the rear portion 82 of the front upper door 72 shown in FIG. 8. The rear portion 82 ends in a fabric piece 83 with straps 81 and 84 securing the rear portion 82 to a vertical portion of the roll cage 85 of the UTV 70 (FIG. 8). A vertical filler panel 86 has spaced-apart magnets (not shown) on the back side of filler panel 86, the magnets being secured by rivets 87. The filler panel 86 is also secured to the vertical portion 85 of the roll cage by straps 88.

Figure 10:
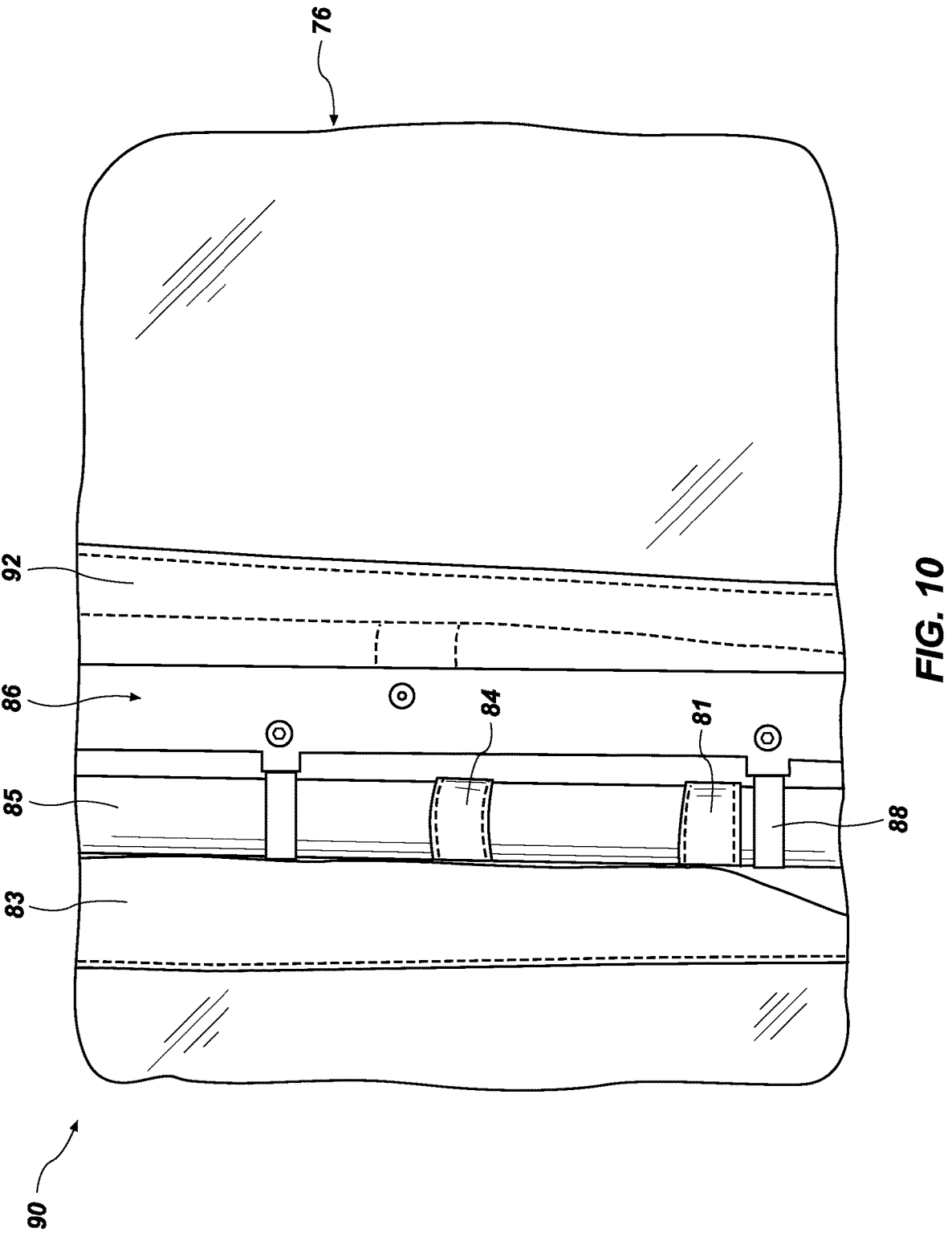

Also shown in FIG. 9 is a front portion 91 of the rear soft upper door 76, including a fabric portion 92 with multiple spaced-apart magnets 94 secured within (e.g., sewn into, etc.) to the fabric portion 92. FIG. 10 shows a view 90 similar to view 80 with the magnets 94 in fabric portion 92 being magnetically connected to the magnets (not shown) in filler panel 86 so the rear soft upper door 76 is in a closed position shown in FIG. 8.

Figure 11:
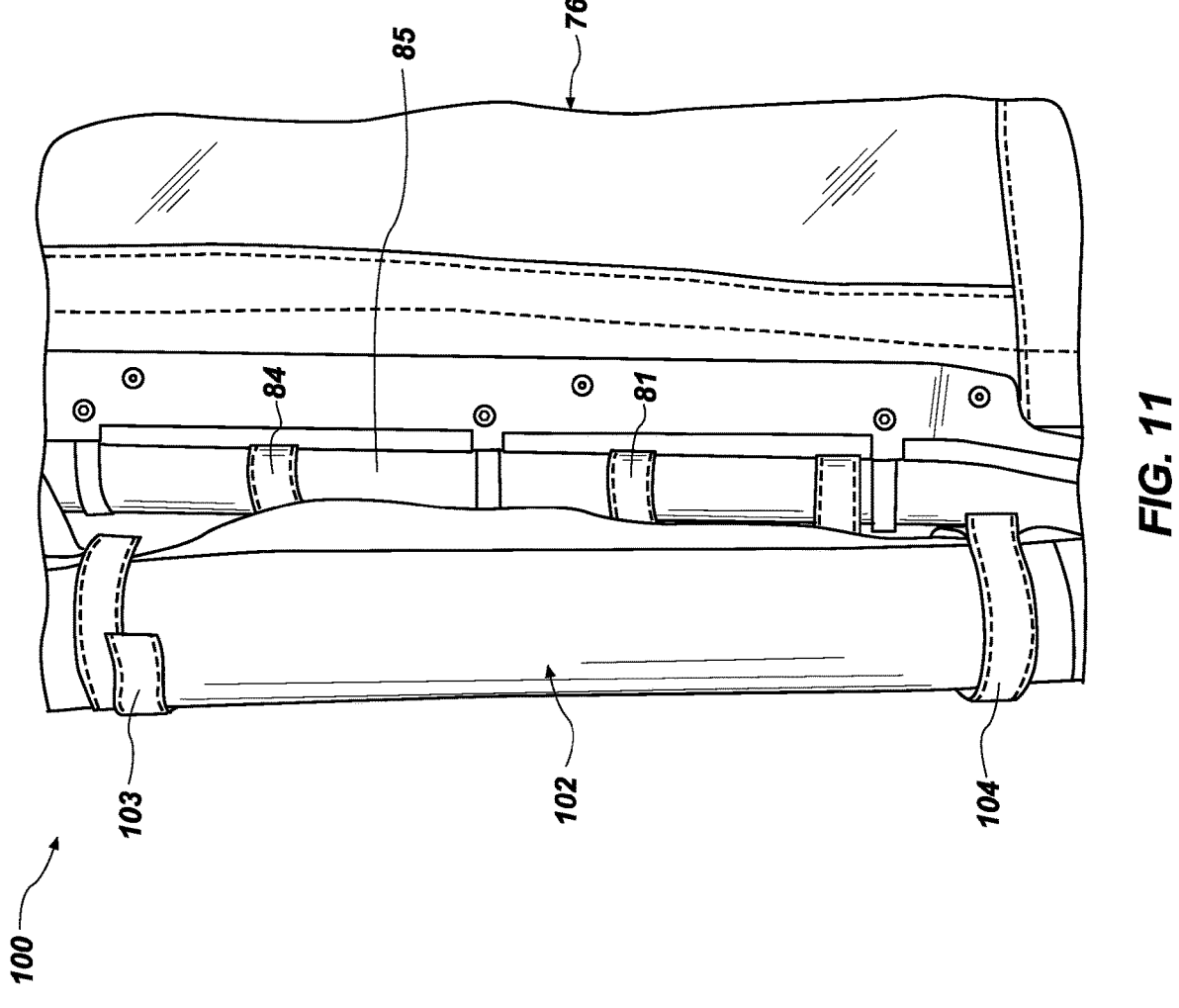
FIG. 11 is a perspective view of portions of a rolled up front upper door and a closed rear upper soft door of a UTV according to an embodiment of the present disclosure.

Referring next to FIG. 11, a view of a UTV 100 is shown wherein the front upper door 72 is shown in the rolled-up arrangement 102, in which the front upper door 72 is rolled from its front end to its rear end, onto the fabric piece 83 on the rear portion 82 of the front upper door 72. The front upper door 72 may be secured in the rolled-up arrangement by straps 103 and 104. With the front upper door 72 in the rolled-up arrangement 102, the fabric piece 83 on the rear portion 82 remains secured to the vertical portion of the roll cage 85 by way of the straps 81 and 84, which hold the rolled up front upper door 72 in place against the vertical portion of the roll cage 85. The rear soft upper door 76 may remain in a closed position, as shown here and in FIGS. 8 and 10.

Figure 12:
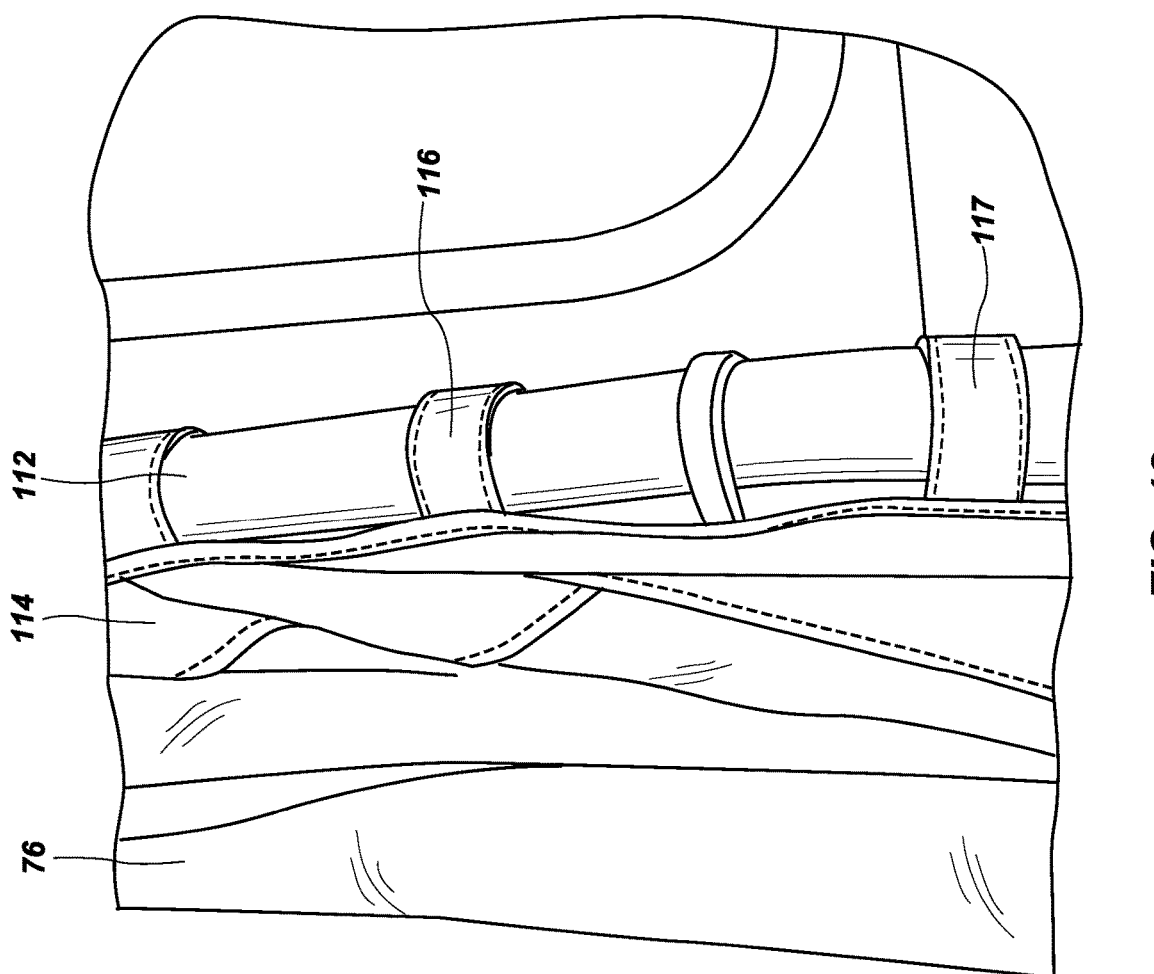
FIG. 12 is a perspective view of a rear upper soft door of a UTV according to an embodiment of the present disclosure.

FIG. 12 shows a close up view of a rear vertical portion of the roll cage 112. A soft fabric member 114 is connected at a rear end of rear soft upper door 76, shown here as partially rolled up. Straps 116 and 117 extend from the rear end of soft fabric member 114 to attach to the rear vertical portion of the roll cage 112, similar to the way that the straps 81 and 84 shown in FIGS. 9-11 secure the rear end of the soft upper door 82 attach to the vertical portion of the roll cage 85 shown in FIGS. 9-11.

Figure 13:
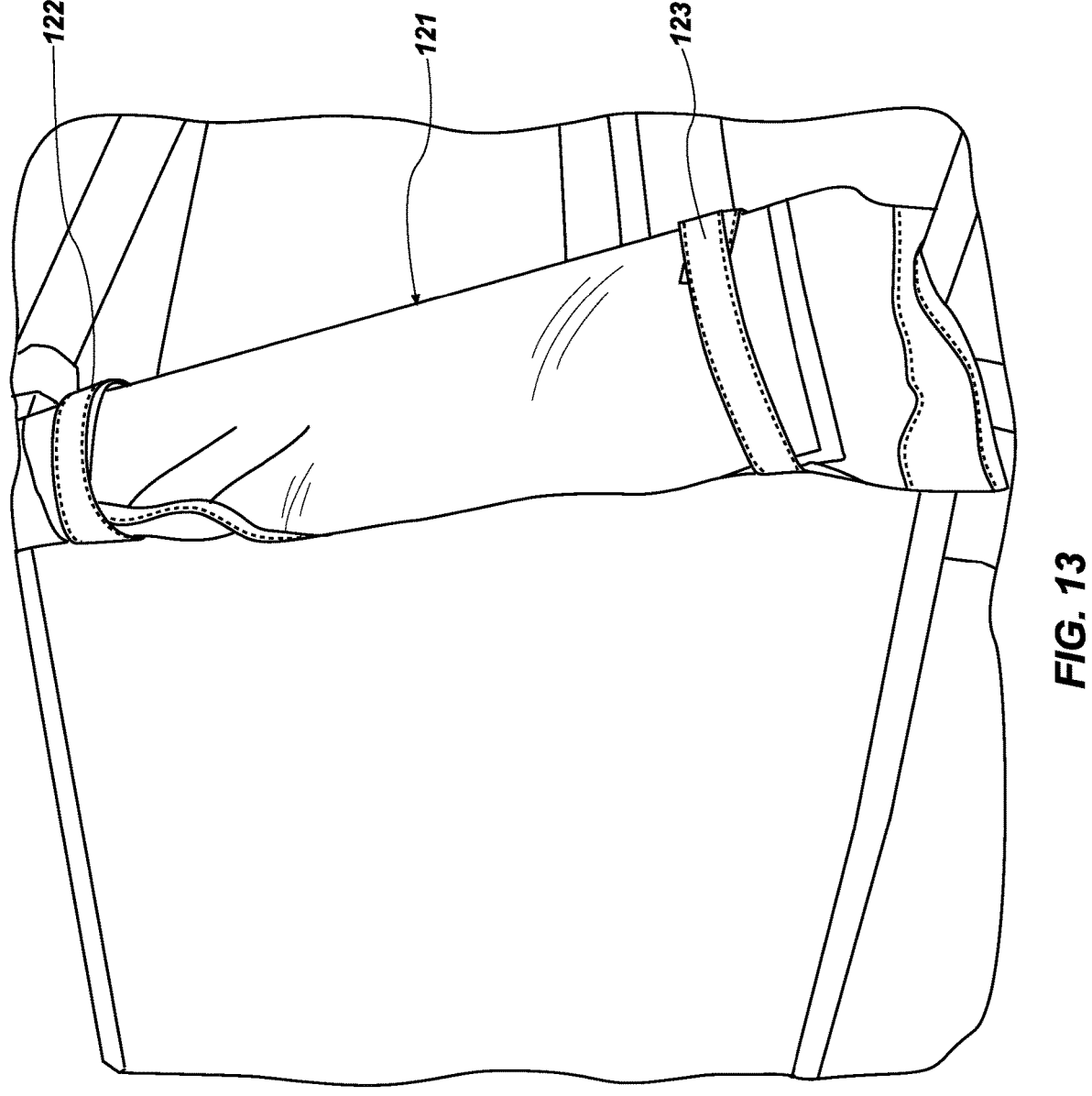
FIG. 13 is a perspective view of a rolled up rear upper soft door of a UTV according to an embodiment of the present disclosure.

Looking now at FIG. 13, a soft upper door 82 is shown in a fully rolled-up arrangement 121. Straps 122 and 123 maintain this rolled-up arrangement 121. As seen in FIG. 12, the straps 116 and 117 secure the soft upper door 82 in the rolled-up arrangement 121 to the roll cage of the UTV 70 (FIG. 8).

Figure 14:
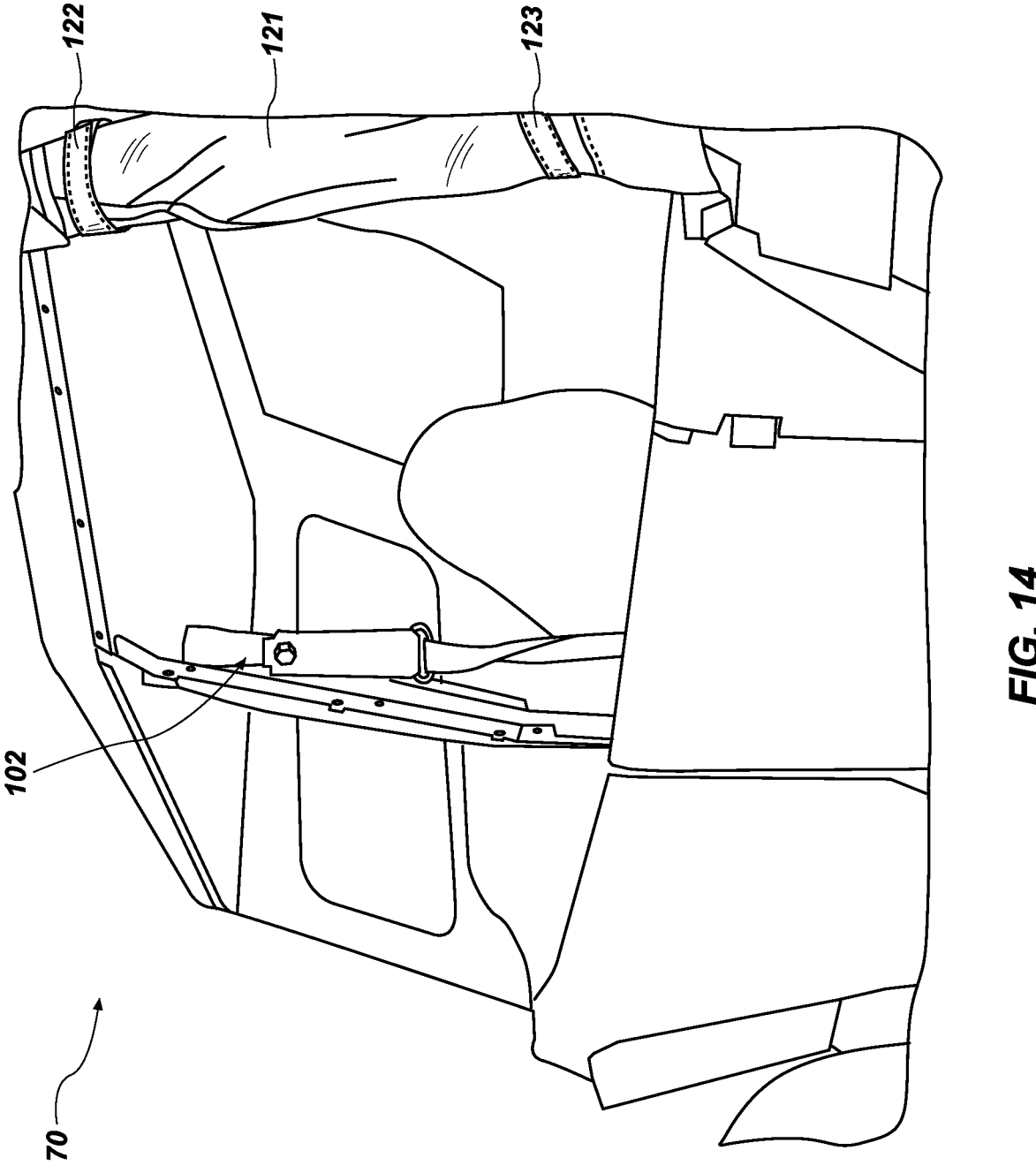
FIG. 14 is a perspective view of front and rear upper soft doors of a UTV with rolled up front and rear soft upper doors according to an embodiment of the present disclosure.

FIG. 14 shows a four-seat UTV 70 with a soft front upper door 72 stowed in a rolled-up arrangement 102 (partially hidden by a seat belt) and a rear soft upper door 82 stowed in a rolled-up arrangement 121, both rolled up according to the description above.

A method for at least partially attaching and/or detaching a soft upper door of a UTV includes: attaching a first set of magnets at a certain location on the upper door; attaching a panel to the off-road vehicle adjacent to the upper door; and attaching a second set of magnets to the panel to coincide with the certain location of the first set of magnets, the second set of magnets having a polarity opposite to the polarity of the first set of magnets; wherein the upper door may be attached to the UTV by placing the first set of magnets on the upper door in a position adjacent to the second set of magnets on the panel.

Embodiments of the present disclosure may provide many useful advantages. The disclosed attachment system may enable UTV upper doors to be easily rolled up and stowed out of the way so that they are not obstacles within the UTV when not needed. The rolled up and stowed soft upper doors may also be easily and quickly unrolled and repositioned in the UTV frame when needed. In addition, the disclosed attachment system eliminates the problems dirt, mud, and/or ice may cause in attaching and/or detaching soft upper doors to a UTV frame with zippers.

The disclosed embodiments for stowing and deploying soft upper doors of a UTV may apply in many different contexts and uses and may be adapted in many different ways, such as in any off-road vehicle having an enclosure, such as motorcycles, ATVs, hunting vehicles, golf carts, and utility carts.

The soft upper door may not have a window therein. The magnets may be located at the back, or inside, of the soft door. The rear window of the vehicle may also be secured to the enclosure by opposing sets of magnets, similar to the apparatuses and process above.

Although the foregoing description provides many specifics, these specifics should not be construed as limiting the scopes of the inventions recited by any of the appended claims, but merely as providing information pertinent to some specific embodiments that may fall within the scopes of the appended claims. Features from different embodiments may be employed in combination. In addition, other embodiments may also lie within the scopes of the appended claims. All additions to, deletions from, and modifications of the disclosed subject matter that fall within the scopes of the claims may be embraced by the claims.

What is claimed:

1. An apparatus for selectively attaching and detaching an upper door to a vehicle, comprising:
   a filler panel comprising a front portion securable to the vehicle in front of the upper door, a top portion securable to the vehicle above the upper door, and a first set of magnets at first locations; and
   an upper door including a bottom portion readily securable to and removable from a lower door of the vehicle and a second set of magnets at second locations positionable adjacent to the first locations of the first magnets to removably secure the upper door to the filler panel and to the vehicle.

2. The apparatus of claim 1, wherein the upper door includes a window.

3. The apparatus of claim 2, wherein the upper door comprises a soft upper door.

4. The apparatus of claim 3, wherein the soft upper door may be rolled.

5. The apparatus of claim 4, wherein the vehicle includes a roll cage and an edge of the upper door is connected to the roll cage.

6. A method for attaching and detaching an upper door of a UTV or other vehicle, comprising:
   providing a first set of magnets at first locations of the upper door;
   attaching a filler panel carrying a second set of magnets at second locations to the UTV or other vehicle, such that the first locations and the second locations can be aligned;
   readily and removably securing a bottom portion of the upper door to a lower door of the vehicle; and
   securing the upper door in a deployed orientation on the UTV or other vehicle from an interior of the UTV or other vehicle by aligning the first set of magnets with the second set of magnets and placing the first set of magnets adjacent to the second set of magnets.

7. The method of claim 6, further comprising:

detaching the upper door from the UTV or other vehicle by pulling the first set of magnets away from the second set of magnets.

8. The method of claim 7, wherein detaching the upper door further includes rolling the upper door into a rolled-up arrangement and securing the upper door in the rolled-up arrangement.

9. The method of claim 8, further comprising:

securing the upper door in the rolled-up arrangement to a stowing location on the UTV or other vehicle.

10. The method of claim 8, wherein detaching comprises completely detaching the upper door from the UTV or other vehicle.

11. An apparatus for removably attaching an upper door to a vehicle, comprising:

a filler panel securable to the vehicle and including a first magnet at a first location; and the upper door, including a second magnet at a second location positionable adjacent to the first location to enable the second magnet to magnetically attach to the first magnet at the first location on the filler panel, a bottom portion of the upper door securable to a lower door of the vehicle by snaps.

12. The apparatus of claim 11, wherein the upper door includes a window.

13. The apparatus of claim 11, wherein the first magnet comprises a first plurality of magnets and the second magnet comprises a second plurality of magnets.

14. The apparatus of claim 13, wherein the filler panel is securable to a roll bar of the vehicle.

15. The apparatus of claim 11, wherein the vehicle is a UTV or an off-road vehicle.

16. The apparatus of claim 11, wherein the upper door comprises a soft upper door.

17. The apparatus of claim 16, wherein the soft upper door can be rolled.

18. The apparatus of claim 17, wherein the soft upper door is stowable on or in the vehicle.

19. The apparatus of claim 18, wherein a portion of the soft upper door is connectable to the vehicle in a manner that enables the soft upper door to be rolled up and stowed next to a portion of the vehicle and to be accessed, unrolled, and re-installed when needed.

20. The apparatus of claim 16, wherein the soft upper door is completely removable from the vehicle.

* * * * *